(12) United States Patent
Kikuchi et al.

(10) Patent No.: US 8,588,095 B2
(45) Date of Patent: Nov. 19, 2013

(54) DATA CONVERSION DEVICE AND DATA CONVERSION METHOD

(75) Inventors: Shunsuke Kikuchi, Kawasaki (JP); Yuji Nomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 13/017,276

(22) Filed: Jan. 31, 2011

(65) Prior Publication Data

US 2011/0188510 A1    Aug. 4, 2011

(30) Foreign Application Priority Data

Feb. 2, 2010   (JP) ................. 2010-021442

(51) Int. Cl.
*H04L 12/26* (2006.01)
(52) U.S. Cl.
USPC ....................................... 370/252
(58) Field of Classification Search
None
See application file for complete search history.

(56) References Cited

U.S. PATENT DOCUMENTS

| 7,715,383 | B2 * | 5/2010 | Hori ............................. 370/389 |
| 2009/0097498 | A1 * | 4/2009 | Ohmi et al. ................... 370/461 |
| 2009/0163793 | A1 * | 6/2009 | Koehler et al. ............... 600/365 |
| 2010/0232313 | A1 * | 9/2010 | Aaron et al. .................. 370/252 |
| 2011/0188398 | A1 * | 8/2011 | Baba et al. .................... 370/252 |

FOREIGN PATENT DOCUMENTS

| JP | 2003-283564 A1 | 10/2003 |
| JP | 2008-193468 A1 | 8/2008 |

* cited by examiner

*Primary Examiner* — Hassan Phillips
*Assistant Examiner* — Duc Duong
(74) *Attorney, Agent, or Firm* — Fujitsu Patent Center

(57) ABSTRACT

A data conversion device includes a receiving unit that receives first data and second data, transmitting after a start of the first data, transmitted from the first device to the second device, a transmitting unit that transmits the received first data and second data to a third device, and a control unit that controls a time point of transmitting the second data from the transmitting unit to lengthen a time interval between transmission of the first data and second data from the transmitting unit than a first time interval between transmission of the first data from the transmitting unit and reception of response data to the first data by the receiving unit when the first time interval is longer than a time interval between the transmission of the first data and second data from the first device to the second device.

9 Claims, 14 Drawing Sheets

| 311 | 312 | 313 | 314 | 315 | 316 | 317 | 318 | 319 | 320 |
|---|---|---|---|---|---|---|---|---|---|
| ID NO. | TRANSMISSION SOURCE ADDRESS | TRANSMISSION SOURCE PORT | Cseq | TRANSMISSION DESTINATION ADDRESS | TRANSMISSION DESTINATION PORT | Sseq | CONNECTION STATUS | TRANSMISSION START TIME POINT | DATA CONTENT |
| 1001 | 200A | 1000 | 1 | 300A | 80 | — | SYN | 1:13:45 | ... |
| 1002 | 300A | 80 | 1 | 200A | 1000 | 1001 | SYN/ACK | 1:13:46 | ... |
| 1003 | 200A | 1000 | 2 | 300A | 80 | 1001 | ACK | 1:13:52 | ... |
| 1004 | 200A | 1000 | 3 | 300A | 80 | 1001 | ... | 1:14:05 | ... |
| 1005 | 300A | 80 | 3 | 200A | 1000 | 1002 | ... | 1:14:08 | ... |
| 1006 | 200A | 1000 | 301 | 300A | 80 | 1250 | ... | 1:14:18 | ... |
| 1007 | 300A | 80 | 301 | 200A | 1000 | 1251 | ... | 1:14:20 | ... |
| 1008 | 200A | 1000 | 301 | 300A | 80 | 1250 | ... | 1:14:24 | ... |
| ... | ... | ... | ... | ... | ... | ... | ... | ... | ... |

FIG.6

| TRANSMISSION SOURCE ADDRESS | TRANSMISSION SOURCE PORT | Cseq | TRANSMISSION DESTINATION ADDRESS | TRANSMISSION DESTINATION PORT | Sseq | CONNECTION STATUS | TRANSMISSION START TIME POINT | TRANSMISSION END TIME POINT | RELATED DATA |
|---|---|---|---|---|---|---|---|---|---|
| 200A | 1000 | 3 | 300A | 80 | 1001 | TRANSMISSION COMPLETED | 1:14:05 | 1:14:08 | 1004,1005 |
| 200A | 1000 | 301 | 300A | 80 | 1250 | TRANSMISSION COMPLETED | 1:14:18 | 1:14:20 | 1006,1007 |
| ... | ... | ... | ... | ... | ... | ... | ... | ... | ... |

FIG.7

| ID NO. 351 | TRANSMISSION SOURCE ADDRESS 352 | TRANSMISSION SOURCE PORT 353 | Cseq 354 | TRANSMISSION DESTINATION ADDRESS 355 | TRANSMISSION DESTINATION PORT 356 | Sseq 357 | CONNECTION STATUS 358 | TRANSMISSION START TIME POINT 359 | DATA CONTENT 360 |
|---|---|---|---|---|---|---|---|---|---|
| 2001 | 100 | 1000 | 1 | 400A | 80 | - | SYN | 1:23:45 | ... |
| 2002 | 400A | 80 | 1 | 100 | 1000 | 2001 | SYN/ACK | 1:23:36 | ... |
| 2003 | 100 | 1000 | 2 | 400A | 80 | 2001 | ACK | 1:23:58 | ... |
| 2004 | 100 | 1000 | 3 | 400A | 80 | 2001 | ... | 1:24:05 | ... |
| 2005 | 400A | 80 | 3 | 100 | 1000 | 2002 | ... | 1:24:10 | ... |
| 2006 | 100 | 1000 | 4 | 400A | 80 | 2002 | ... | 1:24:15 | ... |
| 2007 | 400A | 80 | 4 | 100 | 1000 | 2003 | ... | 1:24:17 | ... |
| ... | ... | ... | ... | ... | ... | ... | ... | ... | ... |

| TRANSMISSION SOURCE ADDRESS | TRANSMISSION SOURCE PORT | Cseq | TRANSMISSION DESTINATION ADDRESS | TRANSMISSION DESTINATION PORT | Sseq | CONNECTION TRANSMISSION START TIME POINT | CONNECTION TRANSMISSION END TIME POINT | RELATED DATA | TRANSMISSION END FLAG |
|---|---|---|---|---|---|---|---|---|---|
| 100 | 1000 | 3 | 400A | 80 | 2001 | 1:24:05 | 1:24:10 | 1004,1005 | 1 |
| 100 | 1000 | 4 | 400A | 80 | 2002 | 1:24:15 | 1:24:17 | 1006,1007 | 1 |
| 100 | 1000 | 5 | 400A | 80 | 2003 | – | – | 1008,1009 | 0 |
| ... | ... | ... | ... | ... | ... | ... | ... | ... | ... |

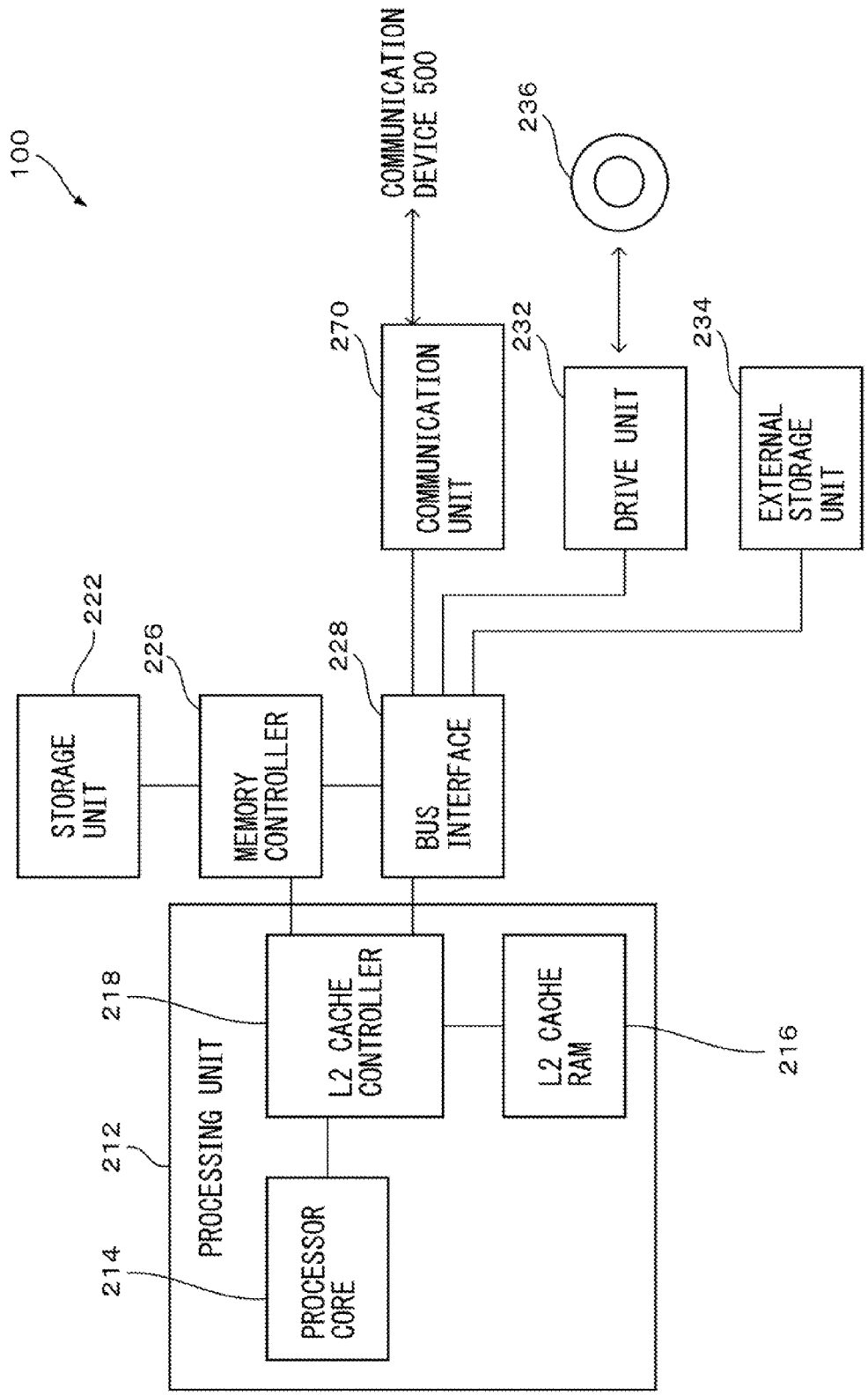

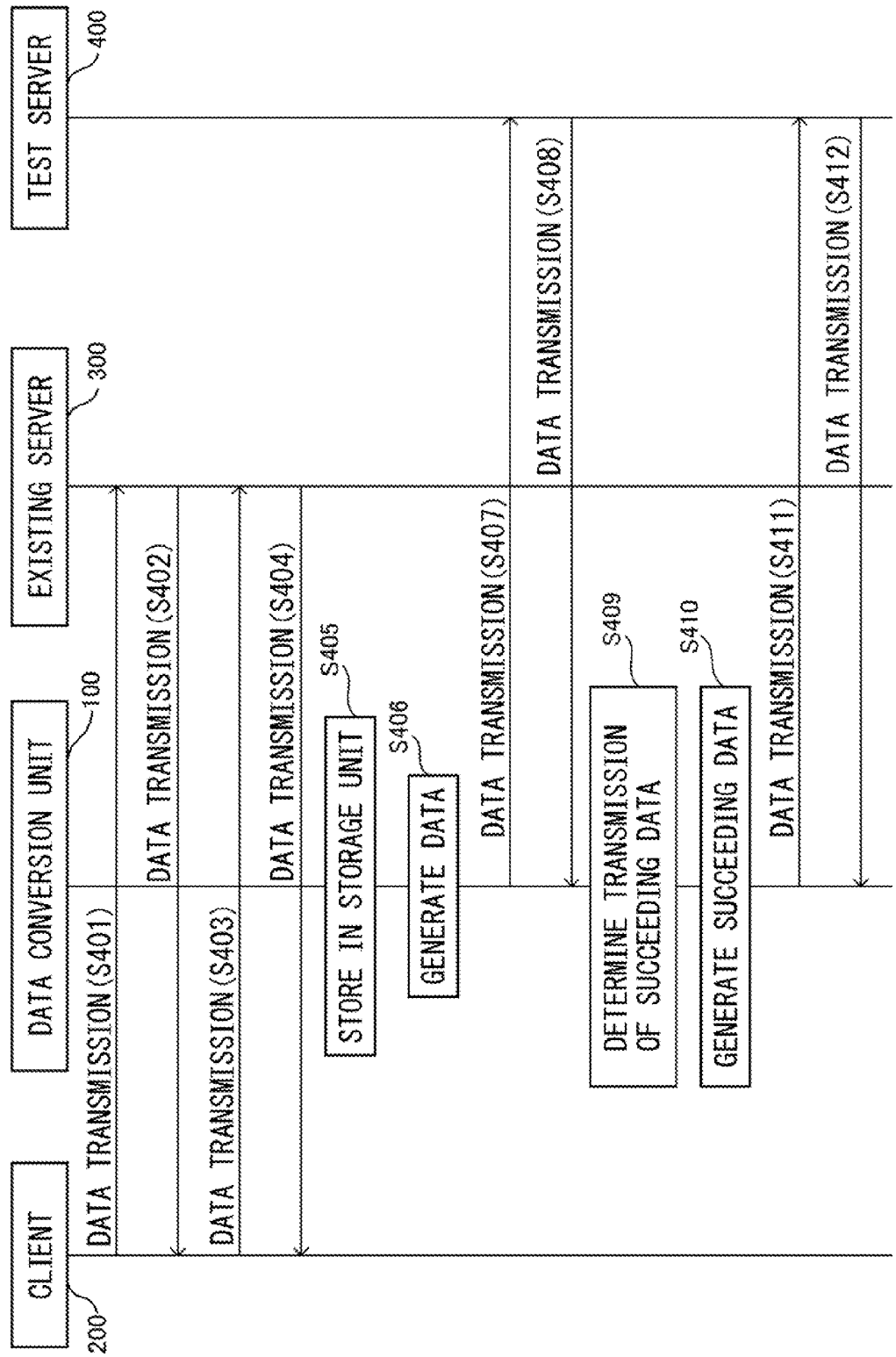

DATA CONVERSION DEVICE AND DATA CONVERSION METHOD

CROSS-REFERENCE TO RELATED APPLICATION

This application is based upon and claims the benefit of priority of the prior Japanese Patent Application No. 2010-21442, filed on Feb. 2, 2010, the entire contents of which are incorporated herein by reference.

FIELD

The embodiments discussed herein relate to a data conversion device and to a data conversion method.

BACKGROUND

In software development, software being developed is tested to confirm that it can be correctly run on a computer. By performing such a test, it is possible to discover not only points for improvement in the software, but also points for improvement in the hardware.

Some points for improvement in the software and hardware cannot be found when the hardware runs the software for only a short time. Therefore, a computer is made to run the software for a long time in the test.

Some tests make the computer under test perform the same processing as an existing computer. In such tests, to raise the hardware load, the computer under test is made to process simulated data. Further, in a test of a computer communicating data with other computers, the practice is to obtain data which has been sent between existing computers and to send the obtained data to the computer under test.

As related art, there are Japanese Laid-Open Patent Publication No. 2008-193468 and Japanese Laid-Open Patent Publication No. 2003-283564.

However, in a test simulating the generation of data, the test data is limited to simulated data, so it is not possible to completely reproduce the content of the actually sent data or the transmission and reception timings of the data. Therefore, after the tested computer starts actual operation, sometimes points for improvement are found in the software and the computer.

Further, a test which obtains data which has been transmitted between computers during actual operation and transmits the data to a computer under test sometimes mistakes the sequence of the data to be transmitted. In such a case, data which does not match the data requiring processing while being run at the computer under test is transmitted to the computer under test, so the computer under test can no longer suitably run the software.

SUMMARY

According to an aspect of an embodiment of the invention, a data conversion device includes a receiving unit that receives first data transmitted from a first device to a second device, and a first transmission time point of transmitting the first data, second data transmitted from the first device to the second device after a start of the first data transmission, and a second transmission time point of transmitting the second data; a transmitting unit that transmits the received first data and second data to a third device; and a control unit that controls a transmission time point of transmitting the second data from the transmitting unit to lengthen a time interval between a transmission time point of transmitting the first data from the transmitting unit and the transmission time point of transmitting the second data from the transmitting unit than a first time interval between the transmission time point of transmitting the first data from the transmitting unit and a reception time point of receiving response data to the first data by the receiving unit when the first time interval is longer than the time interval between the first transmission time point and the second transmission time point.

The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF DRAWINGS

These and other objects and features will become clearer from the following description of the preferred embodiments given with reference to the attached drawings, wherein:

FIG. 5 is a view illustrating one example of existing server transmission information;

FIG. 6 is a view illustrating one example of existing server sequence information;

FIG. 7 is a view illustrating one example of test server transmission information;

FIG. 8 is a view illustrating one example of test server sequence information;

FIG. 10 is a view illustrating one example of a hardware configuration of a data conversion device;

FIG. 12 is a sequence diagram illustrating one example of a data conversion method.

DESCRIPTION OF EMBODIMENTS

Preferred embodiments of the data conversion device and data conversion method will be described in detail below while referring to the attached figures.

System Configuration

Figure 1:
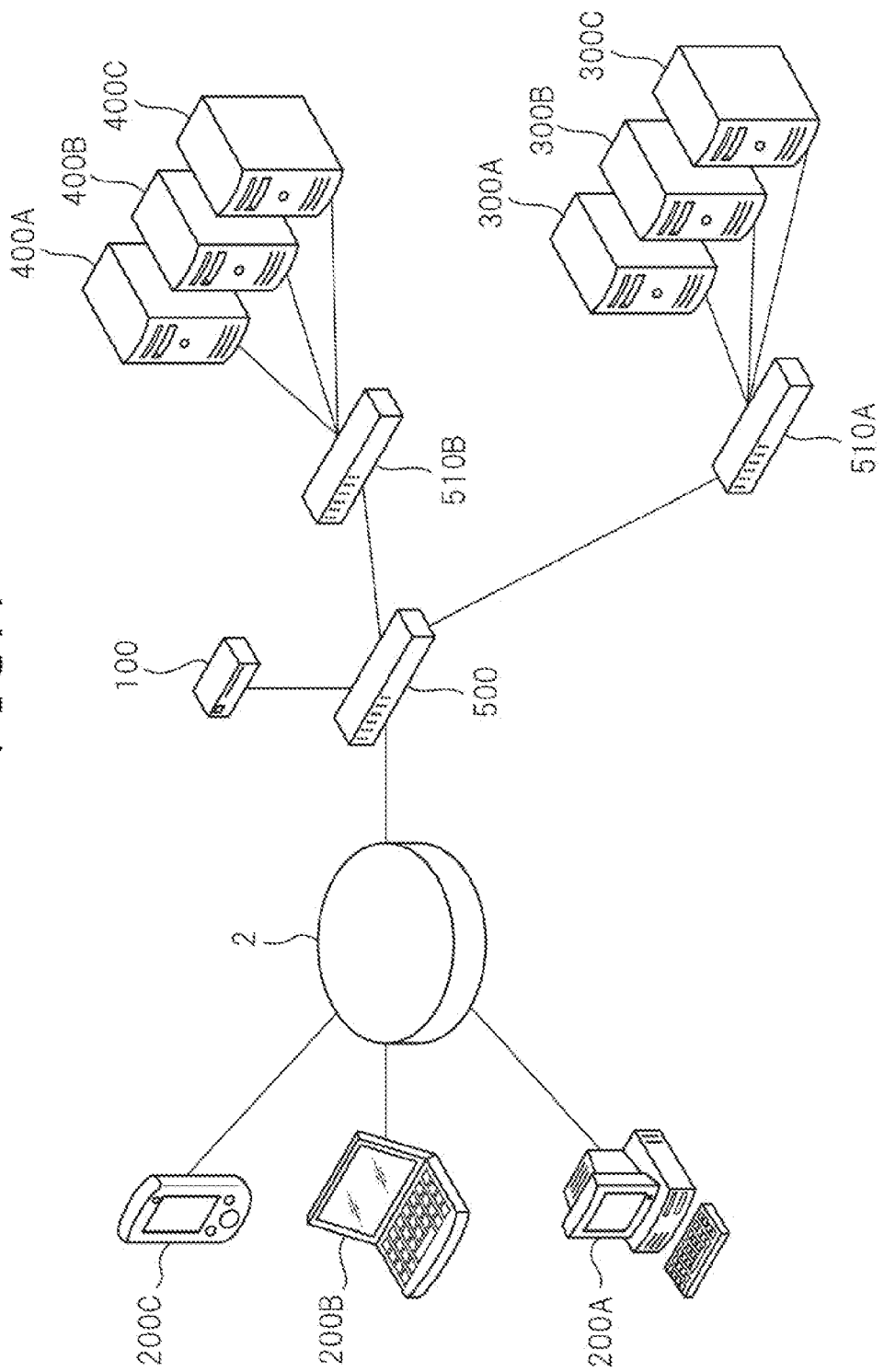
FIG. 1 is a view illustrating one example of a system configuration including a data conversion device.

FIG. 1 is a view illustrating one example of the system configuration including a data conversion device 100. The system configuration 1 illustrated in FIG. 1 has a network 2, a data conversion device 100, clients 200A to 200C, existing servers 300A to 300C, test servers 400A to 400C, a communication devices 500, 510A and 510B. The data conversion device 100, the existing servers 300A to 300C, and the test servers 400A to 400C are connected to the network 2 through the communication devices 500, 510A, 510B. The network 2 is a computer network, for example, a LAN (Local Area Network) or the Internet.

Note that, the numbers of the clients 200, existing servers 300, and test servers 400 illustrated in FIG. 1 are illustrations. Greater numbers than illustrated are also possible. Further, in the following explanation, reference numeral 200 is deemed to indicate any of the clients 200A to 200C, 300 to indicate any of the existing servers 300A to 300C, and 400 to indicate any of the test servers 400A to 400C.

The client 200 is a data processing system requesting predetermined functions from the existing server 300, for example, is a desktop computer, laptop computer, or portable data terminal. The client 200 engages in data communication with the existing server 300 in accordance with a transmission control protocol. The transmission control protocol is, for example, the TCP (Transmission Control Protocol) or the UDP (User Datagram Protocol).

The existing server 300 is a data processing system which has a CPU (Central Processing Unit) and memory and uses the CPU to run software stored in the memory so as to provide the client 200 with predetermined functions. The existing server 300 is, for example, a data processing system which has finished being developed in terms of software and which has begun actual operation. The existing server 300 becomes a destination of transmission of data by the client 200 and communicates data with the client 200 in accordance with a transmission control protocol.

The test server 400 is a data processing system which has a CPU and memory and uses the CPU to run software stored in the memory so as to provide the client 200 with the same functions as the existing server 300. The test server 400 is, for example, a data processing system which is scheduled to provide services to the client 200 by running software after the software has finished being debugged and is a data processing system under test which runs software for a long period of time.

The test server 400, for example, may be a data processing system which provides the same functions as the functions included in the existing server 300, but runs a program differing in computer language from the program included in the existing server 300. Alternatively, the test server 400, for example, may be a data processing system which runs an application program the same as the existing server 300, but is of a type differing in OS (Operating System) and/or hardware. Further, the test server 400, for example, may be a data processing system which runs an application program and OS the same as the existing server 300 together with virtualization software by hardware differing from the hardware of the existing server 300. The test server 400 is designated by the data conversion device 100 as a destination of transmission of data and communicates data with the data conversion device 100 in accordance with the same transmission control protocol as with the existing server 300.

The data conversion device 100 is a data processing device which obtains the data which the client 200 transmits to the existing server 300 and transmits the obtained data to the test server 400 in place of the client 200. The data conversion device 100, for example, may function as a test system device which transmits data to the test server 400 for conducting a test on the test server 400 which runs software for a long period of time. The data conversion device 100 runs address conversion processing which converts the destination of the data transmitted from the client 200 from the existing server 300 to the test server 400. The data conversion device 100 does not use simulated data, but can transmit data which has been transmitted between the client 200 and existing server 300 to the test server 400 for the test. By running a test using the transmission data which has been transmitted to the existing server, it is possible to discover points for improvement in the software and hardware before the test server 400 starts actual operation. Such points for improvement are, for example, stored in a log file stored in the memory of the test server 400 (including time logs of details of processing of the application program, OS, etc., warnings, and other processing) and are discovered by referring to the log file after the test or during the test.

The data conversion device 100 further obtains the data which has been sent by the existing server 300 to the client 200 and detects the sequence of the data transmission between the client 200 and the existing server 300. The data conversion device 100 runs data transmission control processing for controlling the timing of data transmission to the test server 400 so that the sequence of the data transmission between the client 200 and the existing server 300 is also maintained between the data conversion device 100 and the test server 400. A detailed explanation of the data conversion device 100 will be given later using FIG. 2.

The communication devices 500, 510A, 510B are devices which forward input data to the forwarding destination of the data in accordance with the destination address. The destination address is, for example, an IP (Internet Protocol) address or MAC (Media Access Control) address. The communication devices 500, 510A, 510B are, for example, L3 (Layer 3) switches or L2 (Layer 2) switches.

The communication device 500 is connected to the data conversion device 100, the clients 200A to 200C, the existing servers 300A to 300C through the communication device 510A, and the test servers 400A to 400C through the communication device 510B.

The communication device 500 connects a port to which the client 200 is connected and a port to which the existing server 300 is connected so as to provide data communication between the client 200 and the existing server 300. The communication device 500 further connects a port to which the data conversion device 100 is connected and a port to which the test server 400 is connected to provide data communication between the data conversion device 100 and the test server 400.

Further, the communication device 500 performs an operation for copying the frames passing through the port connected to the client 200 or existing server 300 to a port to which the data conversion device 100 is connected. In this way, the communication device 500 can transmit data which has been transmitted between the client 200 and the existing server 300 to the data conversion device 100.

The communication device 500 and the data conversion device 100 may also be the same hardware. The functions and hardware configuration when the communication device 500 and the data conversion device 100 are the same will be explained later using FIG. 11B.

First Example of Configuration of Data Conversion Device

Figure 2:
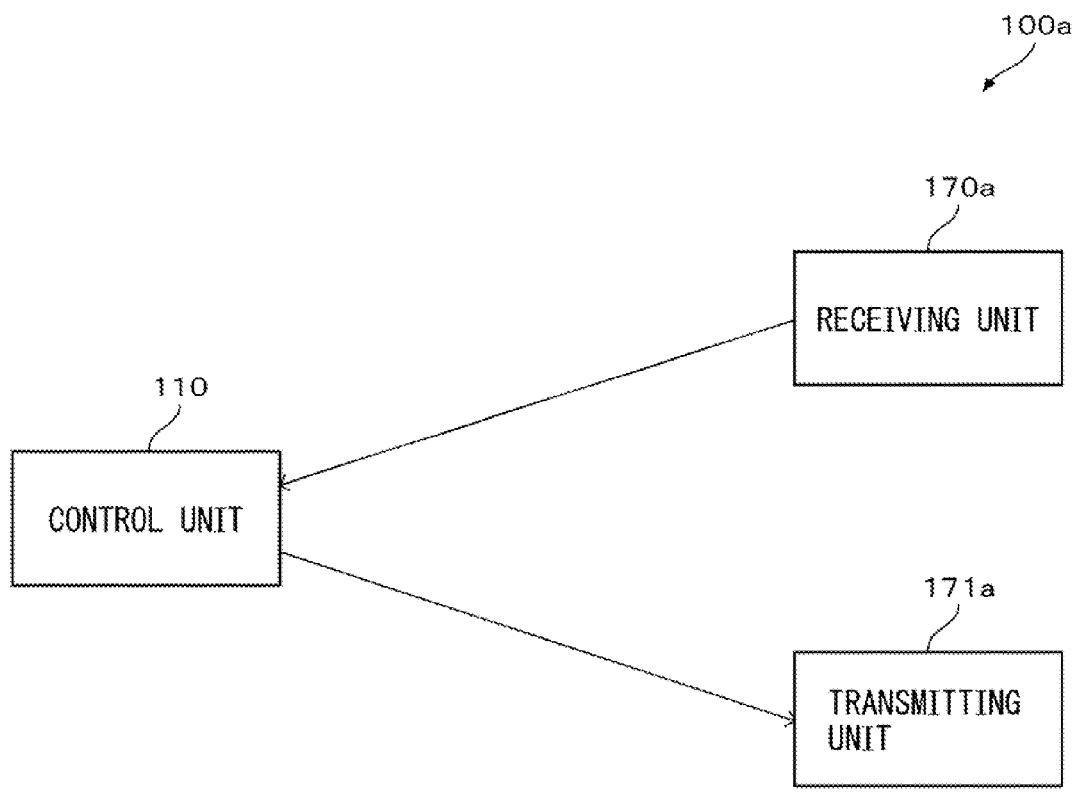
FIG. 2 is a view illustrating a first example of the configuration of a data conversion device.

FIG. 2 is a view illustrating a first example of the data conversion device 100. The first example of the data conversion device 100, that is, the data conversion device 100a, has a control unit 110, a receiving unit 170a, and a transmitting unit 171a.

The receiving unit 170a receives data which has been transmitted from the client 200 to the existing server 300 and data which has been transmitted from the test server 400. The transmitting unit 171a performs processing to transmit data instructed by the control unit 110 to the test server 400.

The control unit 110 runs address conversion processing to convert the address of data which has been transmitted by the client 200 to the existing server 300 to the test server 400 and to change the transmission source of the data from the client 200 to the data conversion device 100.

The control unit 110 further runs data transmission control processing for controlling the timings of transmission of data to the test server 400 so that the sequence of the data transmission between the client 200 and the existing server 300 is also maintained between the data conversion device 100 and the test server 400.

The existing server 300 and the test server 400 sometimes differ in the response time by which they respond to a request from the client 200. For example, the time interval from when connection is established until when connection is broken between the data conversion device 100, which takes the place of the client 200, and the test server 400 sometimes differs from the time interval from when connection is established until when connection is broken between the client 200 and the existing server 300.

The connection means a logical communication channel used in data communication between data processing systems and a communication channel identified using identification information contained in the data transmitted. The connection, for example, corresponds to a communication channel identified by an OSI (Open Systems Interconnection) reference model. The data communication, when for example based on a TCP (Transmission Control Protocol), is identified by the IP address, port number, sequence number, window size, etc.

The reason why the response time of the existing server 300 and the response time of the test server 400 differ is, for example, the differences in hardware and differences in application software and systems software. The "differences in hardware configuration" means, for example, differences in processing times of processors and differences in communication routes. Further, the "differences in system software" means, for example, differences in OS and virtualization software for virtually realizing the OS environment.

When the response time of the test server 400 is longer than the response time of the existing server 300, if the data conversion device 100 transmits a request to the test server 400 in the same way as the transmission timing of the client 200, the test server 400 will receive a succeeding request in the state not completing the response processing. The succeeding request transmitted to the test server 400 is a request generated based on data received by the client 200 from the existing server 300, so the test server 400 will perform data processing different from the existing server 300. This is a point for improvement.

The software run by the existing server 300 and test server 400 will be explained with reference to software relating to an e-trade service. The e-trade service run by the existing server 300 and test server 400 is assumed to execute the following processing:

(1) The server receives a bid for a product A from the client 200. If the bid is higher than any other bids of the other clients, the server runs processing to allocate the product to the client 200 and runs processing to notify the client 200 that purchase is possible.

(2) When the server receives a request for purchase from the client 200, if allocation to the client 200 can be confirmed, the server runs processing to issue the product A to the client 200.

In such processing, if the processing (1) performed by the test server 400 is slower than the processing (1) performed by the existing server 300, the test server 400 will receive the request for purchase from the client 200 in the state where the processing for allocating the product to the client 200 has still not ended. In such a case, the test server 400 will judge that a client to which a product has not been allocated has requested purchase and will not perform the processing (2) for the client 200. After the processing (1) by the test server 400 has finished, the test server 400 will wait for a request for purchase from the client 200, but the client 200 has already requested purchase. The request for purchase will not be resent, so the processing by the test server 400 will be suspended. In this way, if the test server 400 is slower than the existing server 300 in processing time, verification of whether the same processing can be executed will be suspended.

The e-trade service executed by the existing server 300 and the test server 400 is further deemed to perform the following processing.

(3) Another client, after the processing (1) but before the processing (2), sends a bid for the product A. The other client offers a bit higher than the client 200 of the processing (1). However, the server performs processing to reject the purchase of other client since the processing (1) ends.

If the processing (1) by the test server 400 is slower than the processing (1) by the existing server 300, the allocation of the product to the client 200 by the processing (3) will not be finished, the bid of the other client will become the highest bid, and the other client will be allocated the product by the test server 400. If receiving a request for purchase from the client 200 under these circumstances, the test server 400 will not perform the processing for issuing the product A to the client 200 and will wait for processing for ordering from the other client. The other client is refused purchase by the existing server 300 and does not perform processing for ordering, therefore the processing by the test server 400 is suspended. If this way, if the test server 400 is slower than the existing server 300 in processing time, verification of whether the same processing can be executed will be suspended.

To deal with the above points for improvement, the control unit 110 controls the timings of transmission of data to the test server 400 so that the sequence of data transmission between the client 200 and the existing server 300 is maintained even between the data conversion device 100 and the test server 400. Below, an example of the data transmission control processing will be explained.

Data Transmission Control Processing

Figure 3:
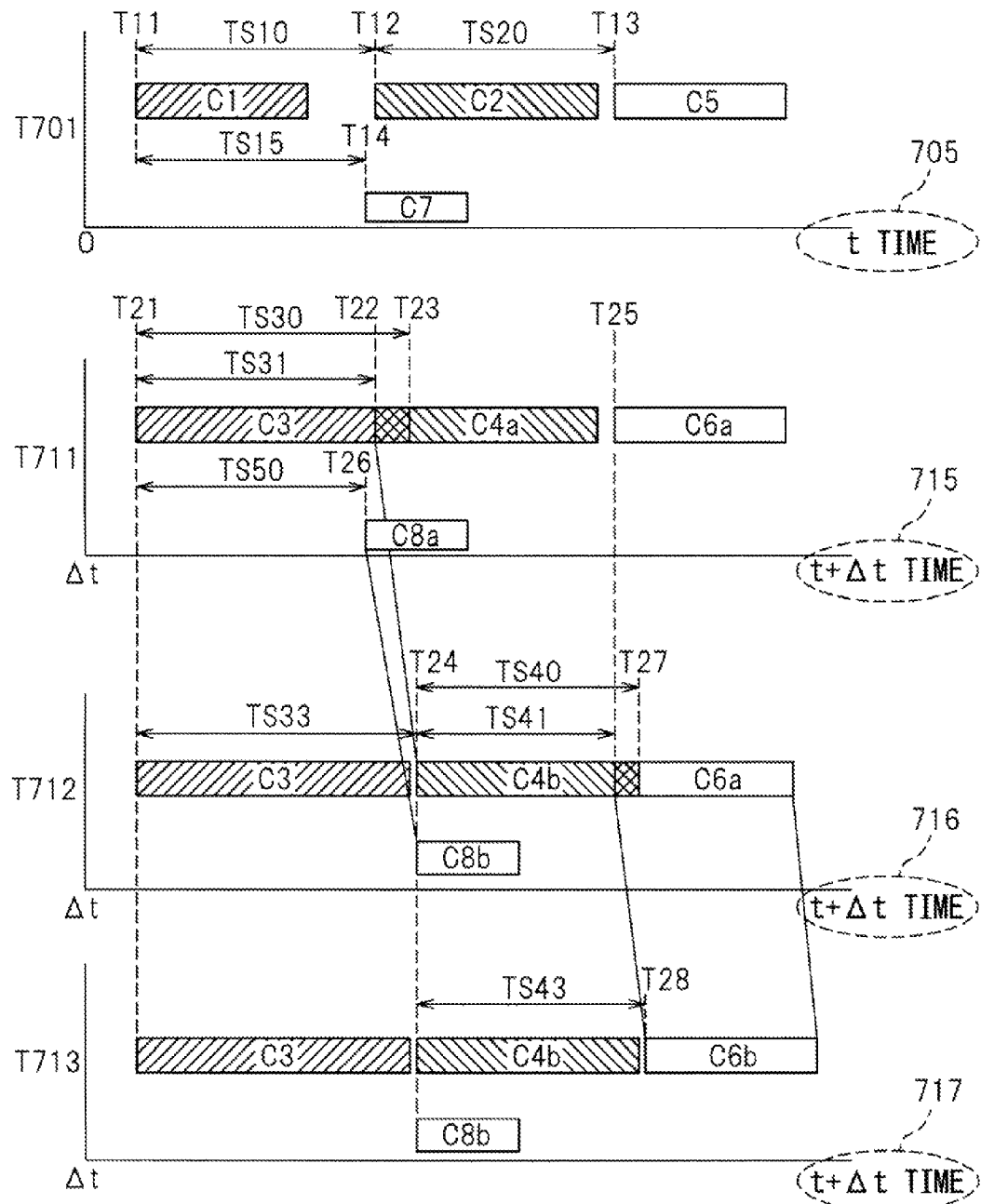
FIG. 3 is a time chart illustrating one example of data transmission control processing.

FIG. 3 is a view illustrating one example of the data transmission control processing. In FIG. 3, T701 is one example of a timing chart of data transmitted between the client 200 and the existing server 300.

C1 illustrates the data transmission between the client 200 and the existing server 300, for example, data transmission including a request by the client 200 to the existing server 300 and a response by the existing server 300 to that request. Further, C1 is, for example, data transmission from when connection by the TCP is established to when connection by the TCP is broken. T11 is the time point when the client 200 first sends request data at C1 to the existing server 300.

C2 illustrates the data transmission, after C1, including transmission of a request by the client 200 to the existing server 300 and transmission of a response by the existing server 300 to the request by the client 200. T12 is the time point when the client 200 first sends request data at C2 to the existing server 300. TS10 is the time interval between the transmission time point T11 of the request data at C1 and the transmission time point T12 of the request data at C2.

C5 illustrates the data transmission, after C2, including transmission of a request by the client 200 to the existing server 300 and transmission of a response by the existing server 300 to the request by the client 200. T13 is the time point when the client 200 first sends request data at C5 to the existing server 300. TS20 is the time interval between the transmission time point T12 of the request data at C2 and the transmission time point T13 of the request data at C5.

C7 illustrates the data transmission, after C1, including transmission of a request the same as the request transmitted by the client 200 at C1 by a client different from the client 200 and transmission of a response by the existing server 300 to that request. For example, in the case of the e-trade service, at C1, the client 200 sends a bid for the product A to the existing server 300 and, at C7, a client different from the client 200 transmits a bid for the product A. T14 is the time point when the client different from the client 200 first sends request data at C7 to the existing server 300. TS15 is the time interval between the transmission time point T11 of the request data at C1 and the transmission time point T14 of the request data at C7.

C2, C5, and C7 are data transmissions between the client and the existing server, for example, from when connection is established to when connection is broken.

In FIG. 3, T711, T712, and T713 are examples of timing charts of data transmitted between the data conversion device 100 and the test server 400. The data conversion device 100 performs data transmission and reception processing, address conversion processing, and data transmission control processing, so a time difference ΔT arises between the reception data and the transmission data. Therefore, the data is transmitted to the test server 400 after the elapse of ΔT after obtaining the transmission data between the client 200 and the existing server 300. Therefore, the data transmission time between the data conversion device 100 and the test server 400 illustrated in 715, 716, and 717 becomes the data transmission time between the client 200 and the existing server 300 illustrated at 705 plus ΔT.

C3 illustrates the data transmission of the data, which is transmitted by the client 200 to the existing server 300 at C1, by the data conversion device 100 to the test server 400 and the data transmission including a response of the test server 400 to the transmitted data. C4a and C4b illustrate the data transmission of data, which had been transmitted by the client 200 to the existing server 300 at C2, by the data conversion device 100 to the test server 400 and the data transmission including a response of the test server 400 to the transmitted data. C6a and C6b illustrate the data transmission of data, which had been transmitted by the client 200 to the existing server 300 at C5, by the data conversion device 100 to the test server 400 and the data transmission including a response of the test server 400 to the transmitted data. C8a and C8b illustrate the data transmission of data, which had been transmitted by the client different from the client 200 to the existing server 300 at C7, by the data conversion device 100 to the test server 400 and the data transmission including a response of the test server 400 to the transmitted data. C3, C4a and C4b, C6a and C6b, and C8a and C8b are all, for example, data transmissions between the data conversion device 100 and the test server 400 from when the connection is established to when the connection is broken.

T21 is the time point when the data conversion device 100 first transmitted the request data at C3 to the test server 400. T23 is the time point when the data conversion device 100 received the response data to the data transmitted by the data conversion device 100. TS30 is the time interval between the transmission time point T21 of the request data relating to C3 and the reception time point T23 of the response data to the request data relating to C3. TS31 is the time interval between the transmission time point T21 of the request data relating to C3 and the transmission time point T22 of the request data relating to C4a.

T22 illustrates a transmission time point where, after the elapse, from T21, of the time interval TS10 between the client 200 and the existing server 300, the data conversion device 100 transmits the data at C4a to the test server 400. In this way, when starting the data transmission at C4a at the time point T22, before the test server 400 does not finish processing the data at C3 (T23), the test server 400 receives new data at the time point T22. As explained above, the point for improvement arises due to processing relating to succeeding transmission data being performed before the completion of the processing of the preceding transmission data.

In timing chart T712, TS33 is the time interval between the transmission time point T21 of the request data at C3 and the transmission time point T24 of the request data at C4b corresponding C4a in T711. The data conversion device 100 delays the data transmission at C4a until the data transmission at C3 ends. The data conversion device 100 starts the data transmission C4b at the time point T24 after the end T23 of data transmission at C3. Since the data conversion device 100 performs the data transmission C4b corresponding to C4a after the elapse of the preceding data transmission C3, it is possible to avoid the problem of the test server 400 receiving the data at C4b during processing of the preceding data at C3.

T25 illustrates the time point where, after the elapse, from T21, of the time intervals TS10 and TS20 of the data transmission between the client 200 and the existing server 300, the data conversion device 100 transmits the data at C6a to the test server 400. TS40 is the time interval between the transmission time point T24 of the request data at C4b and the reception time point T27 of the response data to the request data at C4b. TS41 is the time interval between the transmission time point T24 of the request data at C4b and the transmission time point T25 of the request data at C6a. The data transmission at C4b takes the time TS40 corresponding to the time interval TS20 in the same way as C2. As illustrated in T712 when the data conversion device 100 causes a delay of the start of transmission of the data transmission C4b in order to prevent the test server 400 from receiving the data at C4b during the processing the data at C3, before the time point T27 to receive the response data at C4b, the test server 400 receives new data at C6a at the time point T25. As explained above, the point for improvement arises due to processing relating to succeeding transmission data being performed before the completion of the processing of the preceding transmission data.

Therefore, as illustrated in T712, the data conversion device 100 delays the data transmission at C6a until the data transmission at C4b ends. The data conversion device 100 starts the data transmission C6b of the T713 corresponding to C5 at the time point T28 after the time point T27 of reception of the request data relating to C4b. By having the data conversion device 100 perform the data transmission C6b corresponding to C5 after the elapse of the preceding data transmission C4b, it is possible to avoid the problem of the test server 400 receiving the data at C6b during processing of the preceding data at C4b.

In time chart T711, T26 illustrates the time point where, after the elapse, from T21, of the time interval TS15 of the data transmission between the client 200 and the test server 400, the data conversion device 100 transmits the data at C8a corresponding to the data transmission C7 to the test server 400. TS50 is the time interval between the transmission time point T21 of the request data at C3 and the transmission time point T26 of the request data at C8a. When starting the data transmission at C8a at the time point T26, before the test server 400 responds with data at C3, the test server 400 receives new data at C8a. As explained above, the point for improvement arises due to processing relating to succeeding transmission data being performed before the completion of the processing of the preceding transmission data.

TS43 is the time interval between the transmission time point T24 of the request data at C4b and the transmission time point T28 of the request data at C6b. The data conversion device 100 delays the data transmission at C8a until the data transmission relating to C3 ends. As illustrated in T712 the data conversion device 100 starts the data transmission at C8b corresponding to C8a at the time point T24 after the time point T23 of the end of the data transmission at C3. Since the data conversion device 100 performs the data transmission C8b corresponding to C7 after the elapse of the preceding data transmission C3, it is possible to avoid the problem of the test server 400 receiving the data at C6b during processing of the preceding data at C4b.

Second Example of Configuration of Data Conversion Device

Figure 4:
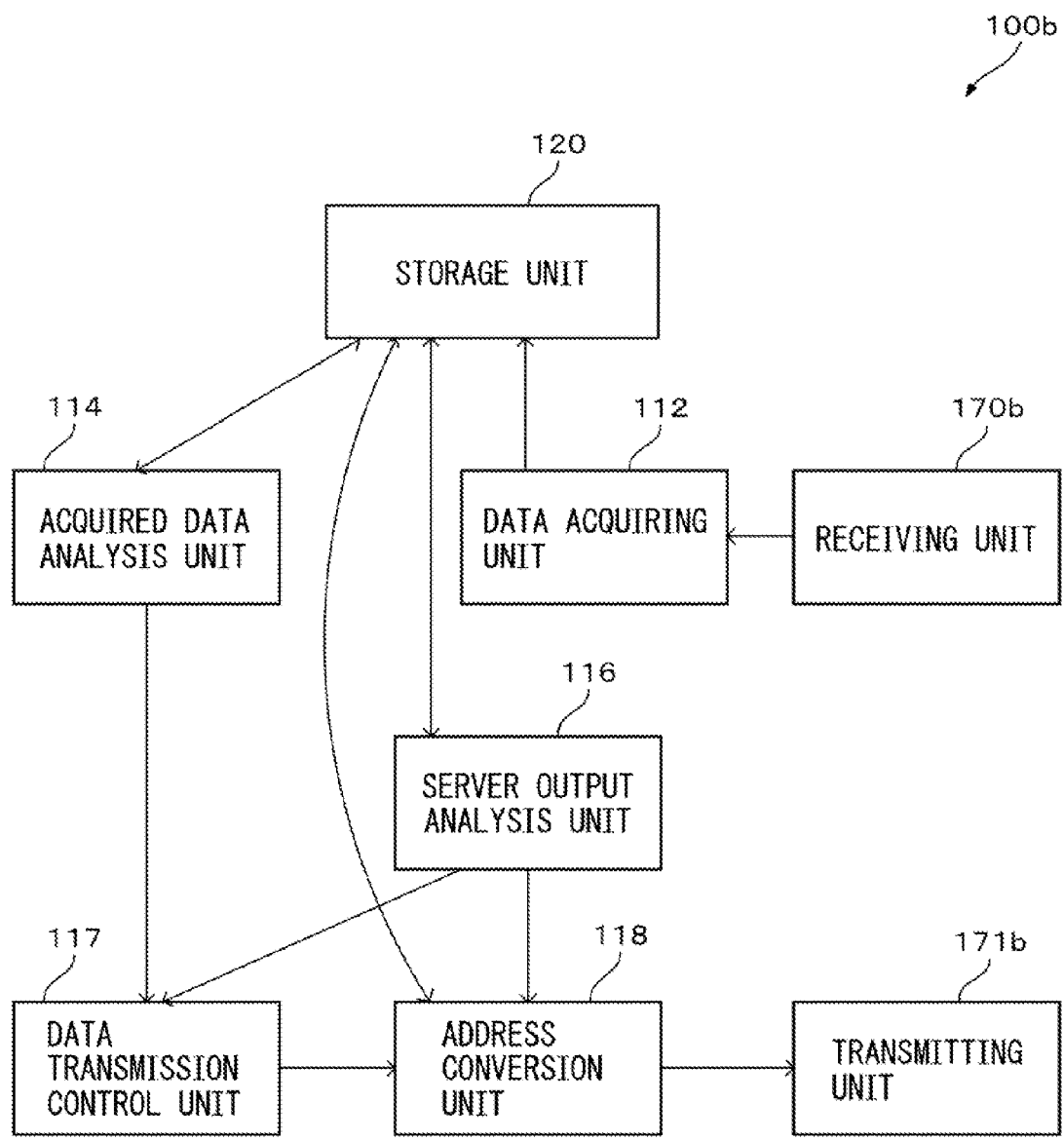
FIG. 4 is a view illustrating a second example of the configuration of a data conversion device.

FIG. 4 is a view illustrating a second example of the configuration of the data conversion device. The data conversion device 100b has a data acquisition unit 112, an acquired data analysis unit 114, a data transmission control unit 117, a server output analysis unit 116, an address conversion unit 118, a storage unit 120, a receiving unit 170b, and a transmitting unit 171b. The receiving unit 170b and the transmitting unit 171b respectively correspond to the receiving unit 170a and the transmitting unit 171a illustrated in FIG. 2 and, with the exception of the functions specified in the following description, have the same functions as the receiving unit 170a and the transmitting unit 171a. Below, the control units illustrated in FIG. 4 will be explained with reference to FIG. 5 to FIG. 9.

The data acquisition unit 112 is a control unit which writes data which has been transmitted and received between the existing server 300 and the client 200 and data which has been transmitted from the test server 400 in a storage unit 120.

The storage unit 120 stores the data which is received by the receiving unit 170a. The received data may also be stored as a table divided into columns prepared for the MAC addresses, IP addresses, data proper, and other items included in the data. Note that, due to storing the received data in the storage unit 120, it is also possible to extend the time difference ΔT.

The acquired data analysis unit 114 is a control unit which extracts specific information from data, stored in the storage unit 120, which is transmitted and received between the existing server 300 and the client 200 and stores the results of extraction in the storage unit 120. The acquired data analysis unit 114, for example, stores the results of extraction as the existing server transmission information 310 illustrated in FIG. 5 and the existing server sequence information 330 illustrated in FIG. 6 in the storage unit 120.

FIG. 5 is a view illustrating one example of the existing server transmission information 310. The existing server transmission information 310 illustrated in FIG. 5 includes an ID number column 311, a transmission source address column 312, a transmission source port column 313, a client side sequence number (Cseq) column 314, a transmission destination address column 315, a transmission destination port column 316, and a server side sequence number (Sseq) column 317. The existing server transmission information 310 further includes a connection status column 318, a transmission start time point column 319, and a data content column 320.

The ID number of the ID number column 311 is a number for identifying each of the entries of the transmission data arranged in ascending order of transmission start time point. The transmission source address column 312 and transmission source port column 313 respectively register the address of the client 200 originating a request for connection and the port number of the client 200. The transmission destination address column 315 and transmission destination port column 316 respectively register the address of the existing server 300 originating a request for connection and the port number of the existing server 300. In this Specification and in the drawings, the transmission source address and transmission destination address are indicated by the reference notations.

The client side sequence number column 314 registers the sequence number transmitted from the client 200, while the server side sequence number column 317 registers the sequence number transmitted from the existing server 300. When the client 200 and the server establish a connection, a communication path is formed between these. For example, in the TCP, to realize byte unit streaming type communication on a communication path, the "sequence number" determining the byte positions is sent for the byte data flowing over the communication path. In the example of the TCP, the sequence number is, for example, a 32-bit sign-less integer. In the example illustrated in FIG. 5 to FIG. 8, the sequence number is shown by decimal notation.

The connection status column 318 registers, for example, a connection establishment request "SYN", a confirmation response "ACK", a connection breaking request "FIN", etc. The transmission start time point column 319 registers the time point of transmission of data. The data content column 320 registers the content of data transmitted by a transmission/reception operation.

FIG. 6 is a view illustrating one example of existing server sequence information. The existing server sequence information 330 is information, in the existing server transmission information 310, which extracts information which manages the start or end time point of one connection—not including the data transmission of the control connection which establishes and breaks connection. The existing server sequence information 330 is used for confirming the data transmission sequence between the existing server 300 and the client 200 when the data transmission control unit 117 transmits data to the test server 400.

The existing server sequence information 330 illustrated in FIG. 6 includes a transmission source address column 331, a transmission source port column 332, a client side sequence number (Cseq) column 333, a transmission destination address column 334, and a transmission destination port column 335. The existing server sequence information 330 further includes a server side sequence number (Sseq) column 336, a connection status column 337, a transmission start time point column 338, a transmission end time point column 339, and a related data column 340. In the columns included in the existing server sequence information 330, explanations of columns of the same names as the columns included in the existing server transmission information 310 will be omitted except for the content described below.

The transmission start time point column 338 registers the time point when, after connection is established, the transmission source of the connection starts the transmission of data, while the transmission end time point column 339 registers the time point when, right before connection is broken, the transmission source of the connection starts the transmission. The related data column 340 registers the ID number of data transmitted over the connection.

Returning to FIG. 4, the server output analysis unit 116 is a control unit which extracts specific information from the data, stored in the storage unit 120, which was transmitted between the test server 400 and data conversion device 100 and stores the results of extraction in the storage unit 120. The server output analysis unit 116, for example, stores the results of extraction as the test server transmission information 350 illustrated in FIG. 7 and the test server sequence information 370 illustrated in FIG. 8 in the storage unit 120.

FIG. 7 is a view illustrating one example of the test server transmission information 350. The test server transmission information 350 illustrated in FIG. 7 includes an ID number column 351, a transmission source address column 352, a transmission source port column 353, a client side sequence number (Cseq) column 354, a transmission destination address column 355, and a transmission destination port column 356. The test server transmission information 350 further includes a server side sequence number (Sseq) column 357, a connection status column 358, a transmission start time point column 359, and a data content column 360.

In the test server transmission information 350, the existing server transmission information 310 is used, as the data which the test server 400 receives. One of the reasons for using the transmission information of the existing server 300 is, for example, to judge if the test server 400 can exhibit performance similar to the existing server 300. The transmission source of data and the transmission destination of data change, so the data conversion device 100 uses the address conversion unit 118 illustrated below to convert the address of the existing server 300 to the address of the test server 400. Further, the transmission start time point input is the time point when the data conversion device 100 or test server 400 actually transmitted data. In the columns included in the test server transmission information 350 other than the transmission source address, transmission destination address, and transmission start time point, explanations of columns of the same names as the columns included in the existing server transmission information 310 are omitted since the same data is registered.

The server output analysis unit 116 registers the address of the test server 400 in the transmission destination address column 355 instead of the address of the existing server 300 registered in the transmission destination address column 315 of the existing server transmission information 310.

FIG. 8 is a view illustrating one example of the test server sequence information. The test server sequence information 370 is information, in the test server transmission information 350, which extracts information which manages the start or end time point of one connection—not including the data transmission of the control connection which establishes and breaks connection. The test server sequence information 370 is used for confirming the data transmission sequence between the existing server 300 and the client 200 when the data transmission control unit 117 transmits data to the test server 400.

The test server sequence information 370 includes a transmission source address column 371, a transmission source port column 372, a client side sequence number (Cseq) column 373, a transmission destination address column 374, and a transmission destination port column 375. The test server sequence information 370 further includes a server side sequence number (Sseq) column 376, a transmission start time point column 378, a transmission end time point column 379, a related data column 380, and a transmission end flag column 381. In the columns included in the test server sequence information 370, explanations of columns of the same names as the columns included in the test server transmission information 350 will be omitted except for the content described below.

The transmission start time point column 378 registers the time point when, after connection is established, the transmission source of the connection starts the transmission of data, while the transmission end time point column 379 registers the time point when, right before connection is broken, the transmission source of the connection starts the transmission. The related data column 380 registers the ID number of data transmitted over the connection.

The transmission end flag column 381 registers whether communication at the connection has ended. When a transmission end flag value "1" is registered, this indicates that the last data transmission before the connection was broken has ended, while when a transmission end flag value "0" is registered, this indicates that the last data transmission before the connection was broken has not ended.

Returning to FIG. 4, the data transmission control unit 117 is a control unit which transmits data, which had been transmitted from the client 200 to the existing server 300, to the test server 400 so as to maintain the data sequence between the existing server 300 and the client 200. The data transmission control unit 117 refers to the start time point and end time point of connection in the existing server sequence information 330 and the test server sequence information 370 and transmits the data to the test server 400 so as to maintain the data sequence between the existing server 300 and the client 200. The data transmission control unit 117 uses a transmission end flag so as to judge if the data which had been transmitted to the test server 400 has finished being transmitted.

The address conversion unit 118 converts the address of the existing server 300 to the address of the test server 400 in the entry of the test server transmission information 350 instructed from the data transmission control unit 117.

Figure 9:
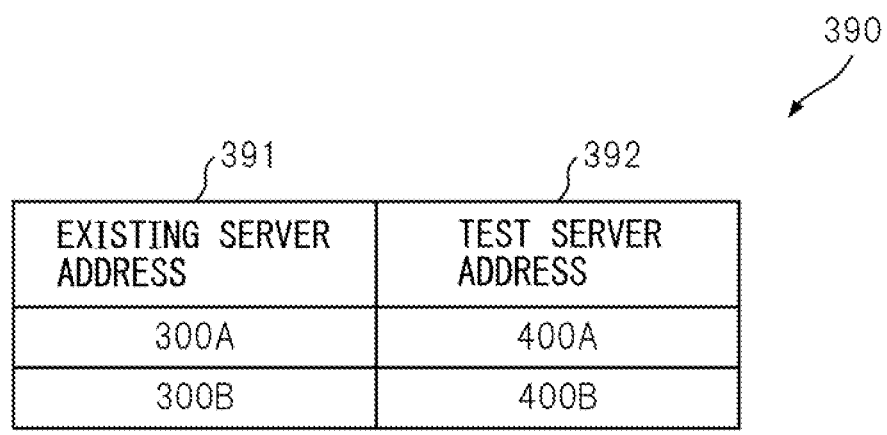
FIG. 9 is a view illustrating one example of a table.

FIG. 9 illustrates an address conversion table, used at the address conversion unit 118, which registers the test server 400 corresponding to the existing server 300. The address conversion table 390 has an existing server address column 391 and a test server address column 392. The existing server 300 of the existing server address column 391 and the test server 400 of the test server address column 392, for example, are linked based on whether they run the same applications. The address conversion unit 118 can refer to the address conversion table 390 so as to register the address of the test server 400 in the transmission destination address column 355 instead of the address of the existing server 300 registered in the transmission destination address column 315 of the existing server transmission information 310.

The address conversion unit 118, after converting the address of the entry concerned in the test server transmission information 350, transfers the data of the entry concerned to the transmitting unit 171b whereby the data of the entry concerned is transmitted to the test server 400. The address conversion unit 118 updates the test server transmission information 350 stored in the storage unit 120 by the data converted in address.

Hardware Configuration of Data Conversion Device

FIG. 10 is a view illustrating an example of the hardware configuration of the data conversion device 100. The data conversion device 100 illustrated in FIG. 10 has a processing unit 212, a storage unit 222, a memory controller 226, a bus interface 228, a drive unit 232, an external storage unit 234, and a communication unit 270.

The processing unit 212 has a processor core 214, an L2 cache (secondary cache) RAM (Random Access Memory)

216, and an L2 cache controller 218 which controls the L2 cache RAM 216. The processing unit 212 connects to the storage unit 222 through the memory controller 226. Further, the processing unit 212 connects through the bus interface 228 to the drive unit 232, the external storage unit 234, and the communication unit 270.

The L2 cache RAM 216 stores part of the content stored in the storage unit 222 in accordance with an instruction from the processor core 214. The L2 cache RAM 216 is, for example, an SRAM (Static Random Access Memory).

The processor core 214 reads out data or instructions from the L2 cache RAM 216, processes data in accordance with the instructions, and stores the processed results in the L2 cache RAM 216 or storage unit 222. The instructions or data are stored in the storage unit 222. The processing unit 212 may for be a multi-core processor carrying a plurality of processor cores 214. The processing unit 212 is, for example, a CPU (Central Processing Unit).

The processing unit 212 runs a program including the instructions or data so as to realize the functions of the control unit 110 explained in FIG. 2 and operate as the data acquisition unit 112, acquired data analysis unit 114, data transmission control unit 117, server output analysis unit 116, and address conversion unit 118 explained in FIG. 4.

The memory controller 226 receives a load instruction from the processing unit 212 or bus interface 228, loads data or instructions from the storage unit 222, and outputs the same to the processing unit 212 or bus interface 228. The memory controller 226, further, receives a store instruction and data covered from the processing unit 212 or bus interface 228 and stores the received data in the storage unit 222.

The storage unit 222 is a storage device comprised of a semiconductor device, for example, is a DRAM (Dynamic Random Access Memory). The external storage unit 236 is a storage device with a larger storage capacity than the storage unit 222 and from which data will not be lost even if not supplied with power, for example, is a disk array having magnetic disks or SSD (Solid State Drive) using a flash memory. The external storage unit 236 can store instructions, data, and programs stored in the storage unit 222.

The bus interface 228 is a bus connecting the processing unit 212 and other connection devices. The bus interface 228 is, for example, a circuit functioning in accordance with the specifications of the AGP (Accelerated Graphics Port) or PCI Express (Peripheral Component Interconnect Express) etc.

The drive unit 232 is, for example, a device which reads and writes data into a floppy disk or CD-ROM, DVD, or other storage medium 236. The drive unit 232 includes a motor which turns the storage medium 236 or a head which reads or writes data from and to the storage medium 236. Note that, the storage medium 236 can store the program. The drive unit 232 reads out the program from the storage medium 236 set at the drive unit 232. The processing unit 212 stores the program read out by the drive unit 232 in the storage unit 222 and/or external storage unit 236.

The communication unit 270 is a device which is connected to a network and is used for communicating with data processing systems connected to the network. As illustrated in FIG. 1, the communication unit 270 connects the communication device 500 with the network. The communication unit 270 is, for example, an NIC (Network Interface Controller).

The communication unit 270, for example, can operate as a receiving unit 170a and a transmitting unit 171a illustrated in FIG. 2 or can operate as a receiving unit 170b and transmitting unit 171b illustrated in FIG. 4.

Figure 11A:
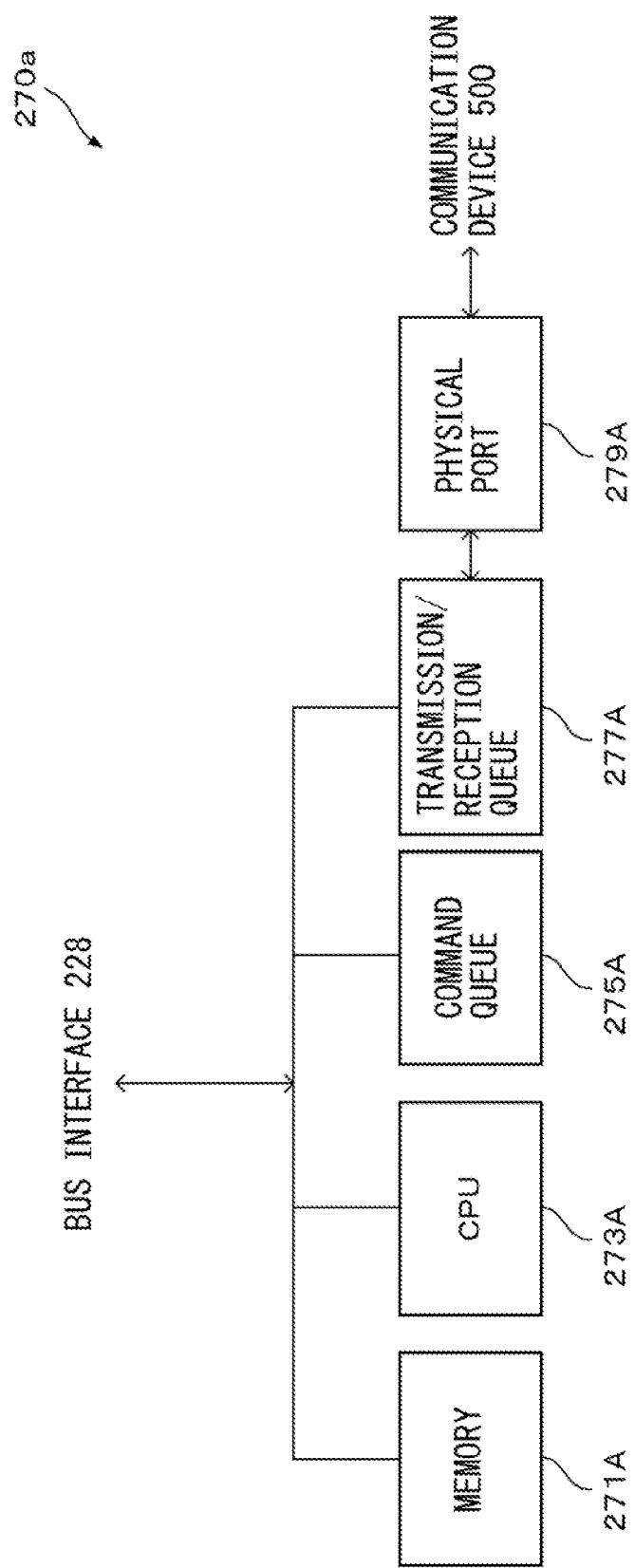
FIG. 11A is a view illustrating one example of a communication unit.

Communication Unit: Case where Data Conversion Device is Separate Hardware from Communication Device FIG. 11A is a view illustrating one example of a communication unit of the data conversion device 100 in the case where the data conversion device 100 is separate hardware from the communication device 500. The communication unit 270a illustrated in FIG. 11A is one example of a communication unit 270 included in the data conversion device 100. The communication unit 270a has a memory 271A, CPU 273A, a command queue 275A, a transmission/reception queue 277A, and a physical port 279A. The command queue 275A holds commands forwarded from the processing unit 212. In the commands, the IP addresses or MAC addresses etc. of the forwarding destinations of the data forwarding operations are identified.

The CPU 273A runs a communication program stored in the memory 271A to realize a communication processing function in accordance with a predetermined protocol. The predetermined protocol is, for example, the Ethernet® or TCP/IP (Transmission Control Protocol/Internet Protocol). The communication processing function realized by the CPU 273A reads a command held by the command queue 275A, then the CPU 273A obtains data from a position of the storage unit 222 identified by the memory address contained in the command and forwards the obtained data to the test server 400. Further, the CPU 273A obtains the data held in the transmission/reception queue 277A and commands identifying the data and stores the data at positions of the storage unit 222 identified by the memory addresses contained in the commands.

The physical port 279A is connected to a network cable and performs input/output of data to and from the network cable. The transmission/reception queue 277A holds data which had been transmitted from the test server 400 to the physical port 279A or holds data which the test server 400 will transmit and outputs the same to the physical port 279A.

Figure 11B:
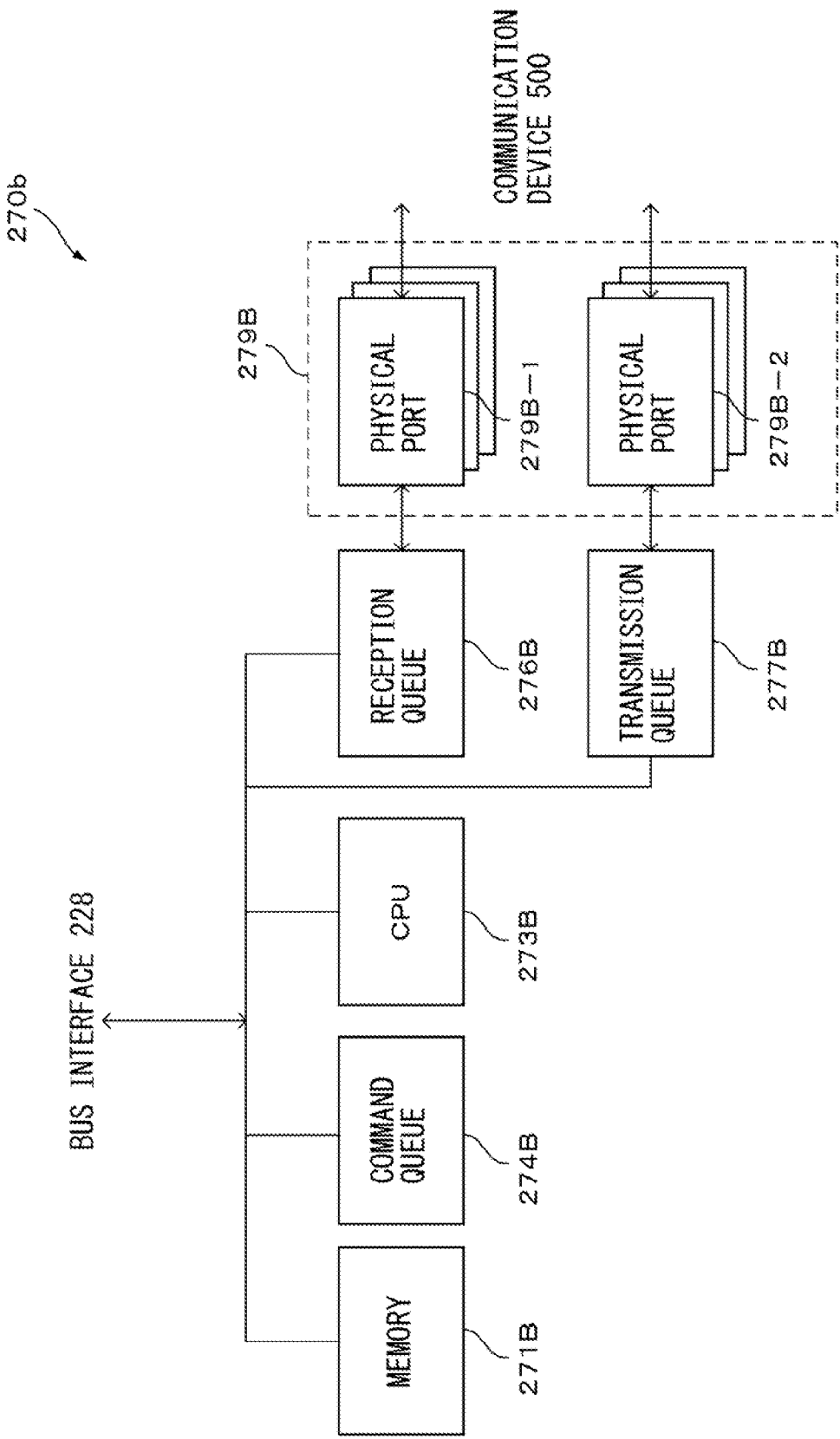
FIG. 11B is a view illustrating one example of a communication unit.

Communication Unit: Case where Data Conversion Device is Hardware Same as Communication Device FIG. 11B is a view illustrating one example of a communication unit of the data conversion device 100 in the case where the data conversion device 100 is the same hardware as the communication device 500. The communication unit 270a illustrated in FIG. 11B is one example of a communication unit 270 included in the data conversion device 100. The communication unit 270b illustrated in FIG. 11B illustrates the configuration when, since the data conversion device 100 includes the communication device 500, the communication unit 270 included in the data conversion device 100 operates as the communication device 500. The communication unit 270b has a memory 271B, CPU 273B, a command queue 274B, a transmission queue 277B, a reception queue 276B, and physical ports 279B. The memory 271B and command queue 274B operate in the same way as the memory 271A and the command queue 275A included in the communication unit 270a illustrated in FIG. 11A, so the explanations of these devices will be omitted.

The physical ports 279B consist of a plurality of physical ports connected to a plurality of network cables and input and output data to and from the network. For example, the physical port 279B-2 operates as a reception use physical port and receives as input data transmitted from the client 200. The physical port 279B-1 operates as a reception use physical port and receives as input data transmitted from the existing server 300 and the test server 400.

The memory 271B stores a routing table including information linking the physical ports, IP addresses, and/or MAC (Media Access Control) addresses. The CPU 273B, like the CPU 273A, runs the communication program stored in the memory 271B so as to realize a communication processing function according to a predetermined protocol and runs routing processing referring to the routing table. The "routing processing", for example, refers to the routing table to investigate the previous address of the data received from a certain reception use physical port 279B-1 and sends out the result to the corresponding transmission use physical port 279B-2.

Data Sequence Between Client and Existing Server or Test Server

FIG. 12 is a view illustrating one example of the data sequence between the client 200 and the existing server 300 or test server 400. The data transmission illustrated in FIG. 12 may, like with a TCP, be performed after establishing connection. Alternatively, like with a UDP, it may perform data communication without establishing connection.

When connection by the TCP is established, for example, as shown below, data transmission is performed.
1) The client transmits an SYN packet to the server,
2) the server transmits an SYN/ACK packet allowing connection by the client 200,
3) the client 200 transmits an ACK packet expressing the start of connection. The data sequence illustrated in FIG. 12 illustrates the data transmission after completion of establishment of connection, even if data communication requiring establishment of connection is being performed. In FIG. 12, the data transmission relating to the establishment or breaking of connection is omitted.

The client 200 transmits data to the existing server 300 (S401). The data transmitted at S401, for example, may be one or more packets having the maximum segment lengths in the TCP or may be a plurality of packets divided into window sizes. In the same way as the other data transmitted in FIG. 12, the data may be one or more packets having the maximum segment lengths or may be a plurality of packets divided into window sizes. The data which is transmitted at S401, for example, corresponds to data identified by the ID number 1004 illustrated in the existing server transmission information 310 in FIG. 5.

The existing server 300 transmits data as a response to the data transmitted from the client 200 (S402). The data transmitted at S402, for example, corresponds to data identified by the ID number 1005 illustrated in the existing server transmission information 310.

Further, the client 200 transmits data to the existing server 300 (S403). The data which is transmitted at S403, for example, corresponds to data identified by the ID number 1006 illustrated in the existing server transmission information 310. The existing server 300 transmits data as a response to the data transmitted from the client 200 (S404). The data transmitted at S404, for example, corresponds to data identified by the ID number 1007 illustrated in the existing server transmission information 310.

The control unit 110 of the data conversion device 100 receives the data transmitted at S401 to S403 through the communication device 500 and stores the data in the storage unit 120 (S405). The control unit 110 uses the data stored in the storage unit 120 to generate the test server transmission information 350.

After the elapse of the ΔT time, the control unit 110 generates data to be transmitted to the test server 400 (S406). At S406, the control unit 110 searches the storage unit 120 for untransmitted data and converts the destination address of the untransmitted data to the address of the test server 400 corresponding to the existing server 300 whose address is the destination address of the untransmitted data. The conversion of the address performed at S406, for example, is performed by the control unit 110 referring to the address conversion table 290 illustrated in FIG. 9.

The data conversion device 100 transmits the generated data to the test server 400 (S407). The data transmitted at S407, for example, corresponds to the data identified by the ID number 2004 illustrated in the test server transmission information 350. The test server 400 transmits data as a response to the data transmitted from the client 200 (S408). The data transmitted at S408, for example, corresponds to the data identified by the ID number 2005 illustrated in the test server transmission information 350.

The data transmission (S407) and the data transmission (S408) illustrated in FIG. 12 correspond to the data transmission C3 illustrated in FIG. 3.

The control unit 110, when receiving response data from the test server 400, performs data transmission control processing so as to determine the transmission timing of the succeeding data (S409). A detailed example of the transmission timing of the succeeding data shown at S409 will be explained later using FIG. 13 and FIG. 14.

When the data transmission is determined, the control unit 110 generates data to be transmitted to the test server 400 (S410). At S410, the data conversion device 100 selects the succeeding data of the data which the client 200 transmitted, in order to generate data following the data generated at S406. The control unit 110 further changes the destination IP address of the selected data to the IP address of the test server 400 and changes the sequence number (Sseq) to the sequence number (Sseq) included in the data transmitted from the test server 400.

The data conversion device 100 transmits the data generated to the test server 400 (S411). The data transmitted at S411, for example, corresponds to the data identified by the ID number 2006 illustrated in the test server transmission information 350. The test server 400 transmits data as a response to the data transmitted from the data conversion device 100 (S412). The data transmitted at S412, for example, corresponds to the data identified by the ID number 2007 illustrated in the test server transmission information 350.

The data transmission (S411) and the data transmission (S412) illustrated in FIG. 12 correspond to the data transmission C4b illustrated in FIG. 3.

The data conversion device 100 performs processing to obtain the data which was transmitted between the client 200 and the existing server 300, convert the obtained data, and transmit the same to the test server 400 according to the suitable transmission timing.

Flow of Processing for Determination of Transmission of Succeeding Data

Figure 13:
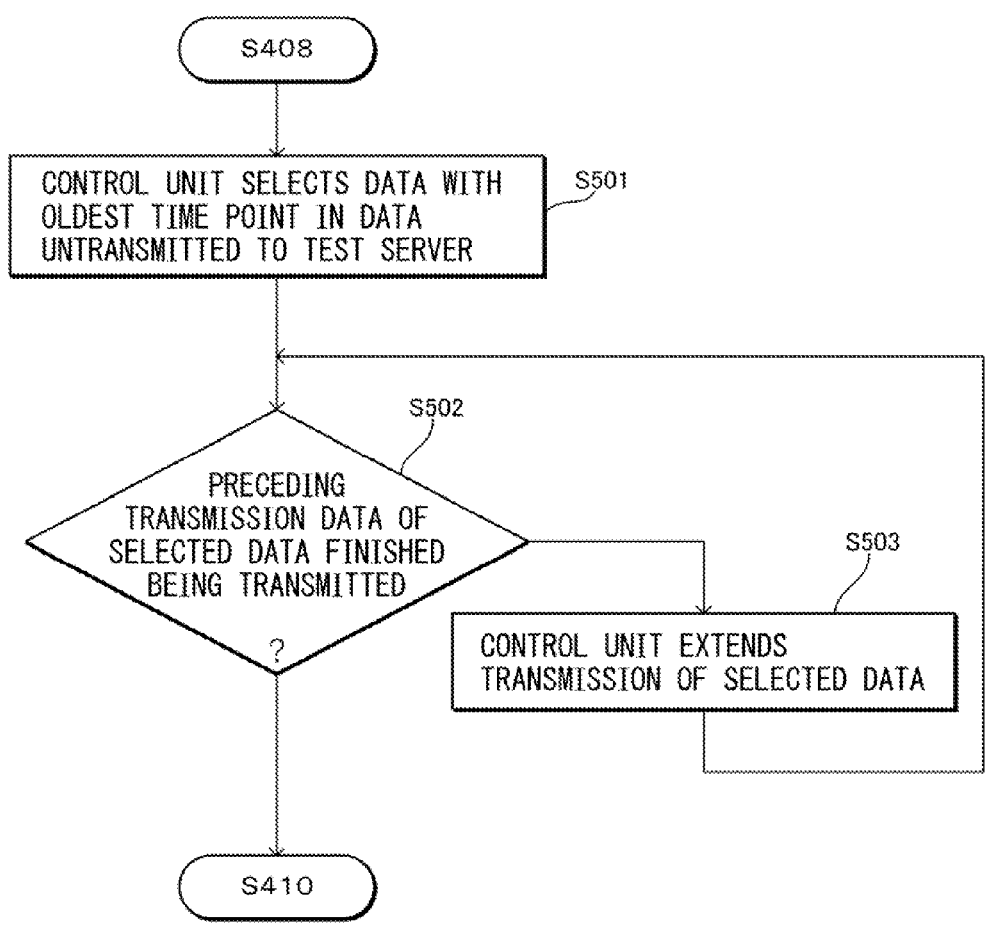
FIG. 13 is a flow chart illustrating one example of a data conversion method.

FIG. 13 is a view illustrating one example of the flow of processing for determination of transmission of the succeeding data. The control unit 110 selects the data with the oldest time point in the data not yet transmitted to the test server 400 (S501). At S501, for example, the control unit 110 selects the data with the oldest transmission start time point in the data with a transmission end flag of the test server sequence information 370 which is not "1". In order to perform the data transmission control processing at the data transmission C8b of FIG. 3, if the data selected at this time is for the same server, it may also be data transmitted by different clients.

The control unit 110 judges if the preceding transmission data of the selected data has finished being transmitted (S502). At S502, for example, the control unit 110 can judge if the transmission end flag of the data with the last transmission start time point before the selected data becomes "1".

When the preceding transmission data of the selected data has not finished being transmitted (S502, NO), the control unit 110 extends the transmission of the selected data (S503) and returns to step S502. When the preceding transmission data of the selected data has finished being transmitted (S502, YES), the control unit 110 proceeds to step S410 illustrated in FIG. 12 and ends the flow of processing for determining the transmission of the succeeding data.

The data conversion device can transmit data which are transmitted to an existing computer to a computer under test in the same sequence as the sequence of the data which transmitted to the existing computer.

All examples and conditional language recited herein after intended for pedagogical purposes to aid the reader in understanding the principles of the invention and the concepts contributed by the inventor to furthering the art and are to be construed as being without limitation to such specifically recited examples and conditions. Neither does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data conversion device comprising:
   a receiving unit that receives first data transmitted from a first device to a second device, and a first transmission time point of transmitting the first data, second data transmitted from the first device to the second device after a start of the first data transmission, and a second transmission time point of transmitting the second data;
   a transmitting unit that transmits the received first data and second data to a third device; and
   a control unit that controls a transmission time point of transmitting the second data from the transmitting unit to lengthen a time interval between a transmission time point of transmitting the first data from the transmitting unit and the transmission time point of transmitting the second data from the transmitting unit than a first time interval between the transmission time point of transmitting the first data from the transmitting unit and a reception time point of receiving response data to the first data by the receiving unit when the first time interval is longer than the time interval between the first transmission time point and the second transmission time point.

2. The data conversion device according to claim 1, wherein
   the receiving unit receives third data transmitted from the first device to the second device after a start of the second data transmission, a third transmission time point of transmitting the third data, and response data to the second data from the third device,
   the transmitting unit transmits the third data to the third device, and,
   the control unit controls a transmission time point of transmitting the third data from the transmitting unit to lengthen a time interval between the transmission time point of transmitting the second data from the transmitting unit and a transmission time point of transmitting the third data from the transmitting unit than a second time interval between the transmission time point of second data from the transmitting unit and a reception time point of response data to the second data by the receiving unit when the second time interval is longer than the time interval between the second data transmission time point and the third transmission time point.

3. The data conversion device according to claim 1, wherein
   the receiving unit receives fourth data transmitted from a fourth device to the second device after transmitting the first data, a fourth transmission time point of transmitting the fourth data, the second data and the fourth data used when the third device runs software stored in the third device, and
   the control unit controls a transmission time point of transmitting the fourth data from the transmitting unit to lengthen a time interval between a time point of transmitting the first data from the transmitting unit and the fourth transmission time point from the transmitting unit than the first time interval.

4. A data conversion method using a data conversion device comprising a receiving unit, a transmitting unit, and a control unit, the method comprising:
   receiving, by the receiving unit, first data transmitted from a first device to a second device, a first transmission time point of the first data, second data transmitted from the first device to the second device after a start of the first data transmission, and a second transmission time point of the second data,
   transmitting, by the transmitting unit, the received first data to a third device,
   controlling, by the control unit, a transmission time point of transmitting the second data from the transmitting unit to lengthen a time interval between a transmission time point of transmitting the first data from the transmitting unit and a transmission time point of transmitting the second data from the transmitting unit than a first time interval between the transmission time point of transmitting the first data from the transmitting unit and a reception time point of receiving response data to the first data by the receiving unit when the first time interval is longer than the time interval between the first transmission time point and the second transmission time point, and
   transmitting, by the transmitting unit, the second data from the transmitting unit to the third device at the controlled time point by the control unit.

5. The data conversion method according to claim 4, further comprising
   receiving, by the receiving unit, third data transmitted from the first device to the second device after a start of the second data transmission, a third transmission time point of transmitting the third data, and response data to the second data from the third device,
   transmitting, by the transmitting unit, the third data to the third device, and,
   controlling, by the control unit, a transmission time point of transmitting the third data from the transmitting unit to lengthen a time interval between a transmission time point of transmitting the second data from the transmitting unit and a transmission time point of transmitting the third data from the transmitting unit than a second time interval between the transmission time point of second data by the transmitting unit and a reception time point of receiving response data to the second data by the receiving unit when the second time interval is longer than the time interval between the second data transmission time point and the third transmission time point.

6. The data conversion method according to claim 4, further comprising:
   receiving, by the receiving unit, fourth data transmitted from a fourth device to the second device after transmitting the first data, a fourth transmission time point of transmitting the fourth data, the second data and the fourth data used when the third device runs software stored in the third device, and controlling, by the control unit, a transmission time point of transmitting the fourth data from the transmitting unit to lengthen a time interval between a time point of transmitting the first data from the transmitting unit and the fourth transmission time point from the transmitting unit than the first time interval.

7. A computer-readable, non-transitory medium storing a program that causes a computer execute a procedure for a data conversion device comprising a receiving unit, a transmitting unit, and a control unit, the procedure comprising:

receiving, by the receiving unit, first data transmitted from a first device to a second device, a first transmission time point of the first data, second data transmitted from the first device to the second device after s start of the first data transmission, and a second transmission time point of the second data, transmitting, by the transmitting unit, the received first data to a third device, controlling, by the control unit, a transmission time point of transmitting the second data from the transmitting unit to lengthen a time interval between a transmission time point of transmitting the first data from the transmitting unit and a transmission time point of transmitting the second data from the transmitting unit than a first time interval between the transmission time point of transmitting the first data from the transmitting unit and a reception time point of receiving response data to the first data by the receiving unit when the first time interval is longer than the time interval between the first transmission time point and the second transmission time point, and transmitting the second data from the transmitting unit to the third device at the controlled time point by the control unit.

8. The computer-readable, non-transitory medium according to claim 7, the procedure further comprising:

receiving, by the receiving unit, third data transmitted from the first device to the second device after a start of the second data transmission, a third transmission time point of transmitting the third data, and response data to the second data from the third device, transmitting, by the transmitting unit, the third data to the third device, and, controlling, by the control unit, a transmission time point of transmitting the third data from the transmitting unit to lengthen a time interval between a transmission time point of transmitting the second data from the transmitting unit and a transmission time point of transmitting the third data from the transmitting unit than a second time interval between the transmission time point of second data by the transmitting unit and a reception time point of receiving response data to the second data by the receiving unit when the second time interval is longer than the time interval between the second data transmission time point and the third transmission time point.

9. The computer-readable, non-transitory medium according to claim 7, the procedure further comprising:

receiving, by the receiving unit, fourth data transmitted from a fourth device to the second device after transmitting the first data, a fourth transmission time point of transmitting the fourth data, the second data and the fourth data used when the third device runs software stored in the third device, and controlling, by the control unit, a transmission time point of transmitting the fourth data from the transmitting unit to lengthen a time interval between a time point of transmitting the first data from the transmitting unit and the fourth transmission time point from the transmitting unit than the first time interval.

* * * * *